Aug. 15, 1961   H. D. F. PETERS   2,996,660
ELECTRICAL TESTING DEVICE
Filed Dec. 24, 1956   3 Sheets-Sheet 3

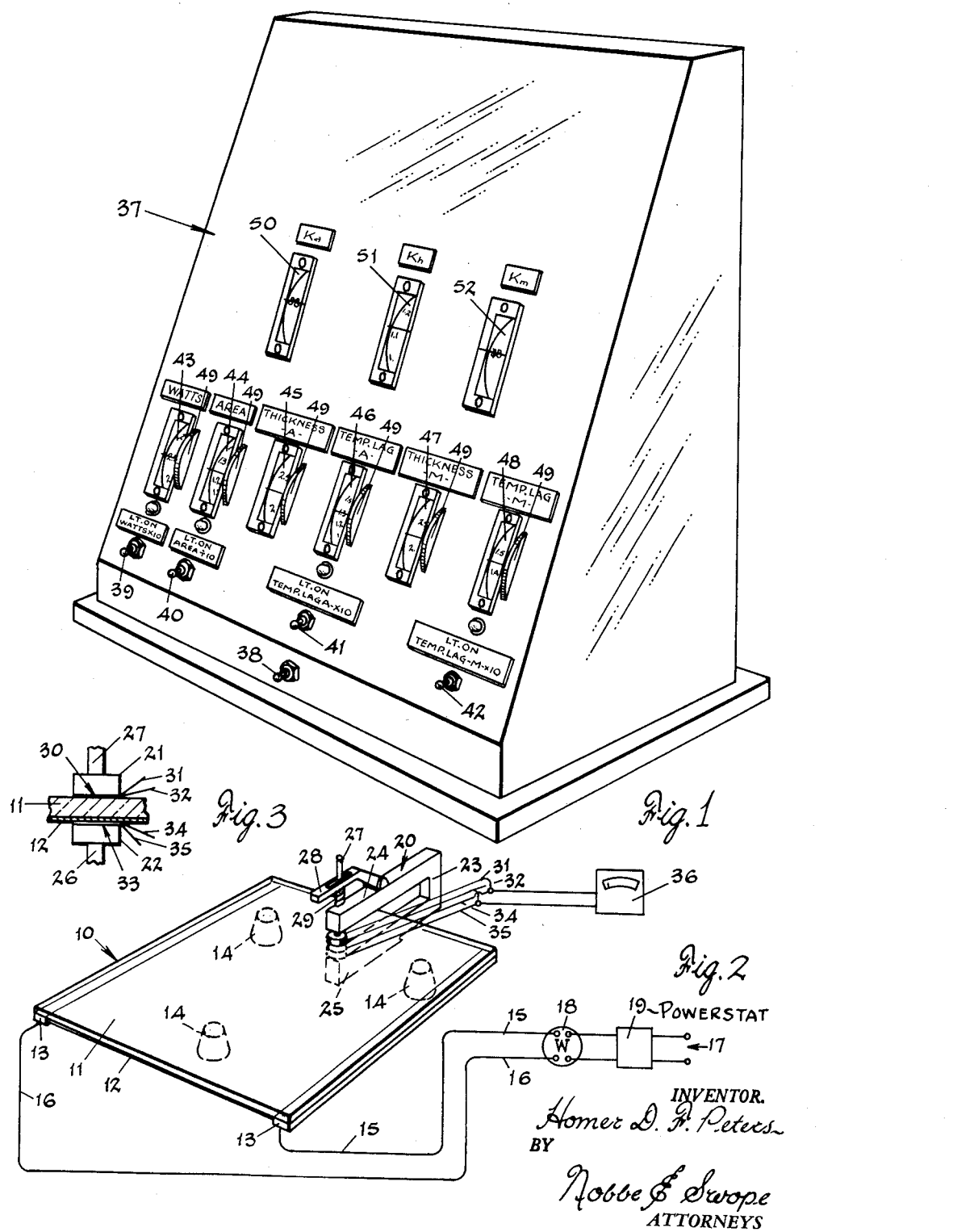

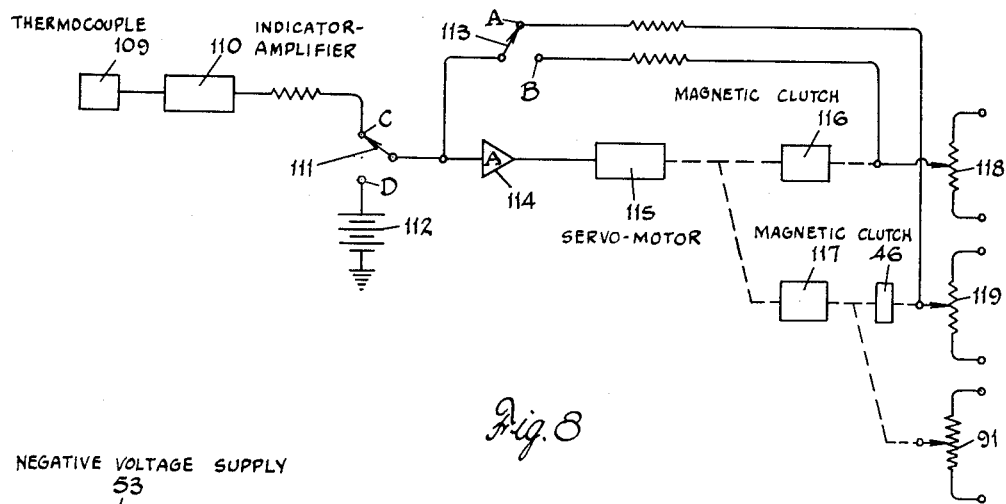
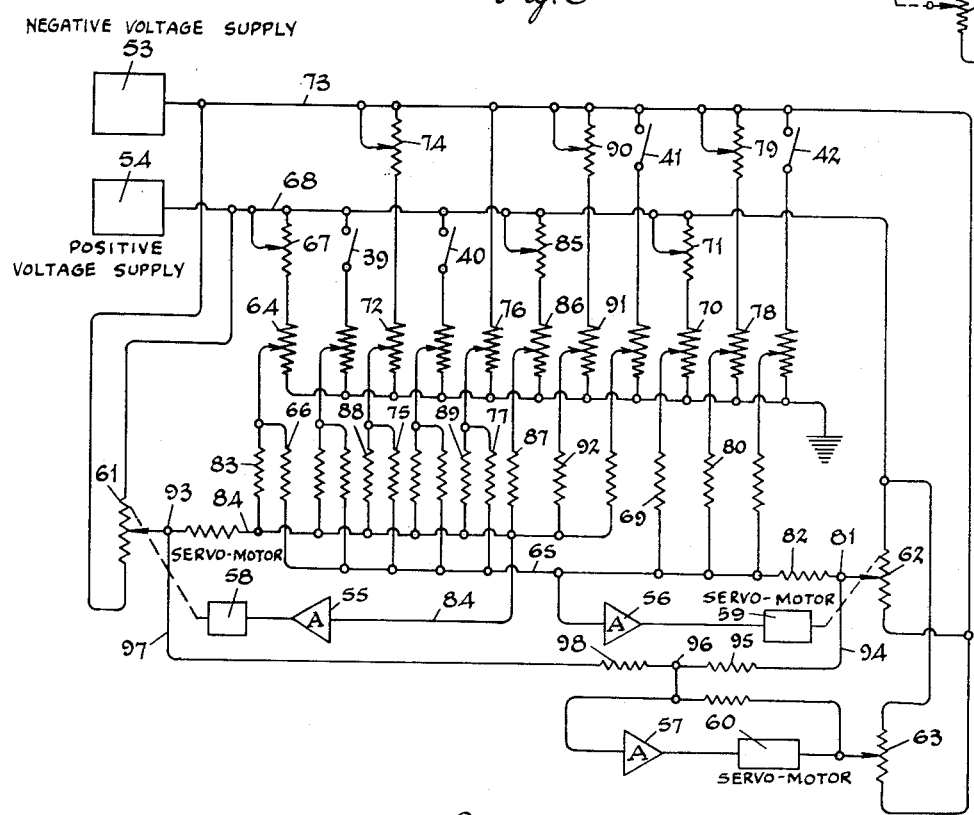

INVENTOR.
Homer D. F. Peters
BY
Nobbe & Swope
ATTORNEYS

United States Patent Office 2,996,660
Patented Aug. 15, 1961

2,996,660
ELECTRICAL TESTING DEVICE
Homer D. F. Peters, Pittsburgh, Pa., assignor to Libbey-Owens-Ford Glass Company, Toledo, Ohio, a corporation of Ohio
Filed Dec. 24, 1956, Ser. No. 630,106
6 Claims. (Cl. 324—32)

This invention relates to electrically conducting glass structures such as windshields having an electrically conducting film disposed on a surface thereof. More particularly, this invention is concerned with an apparatus for measuring the electrical properties of the electrically conducting film on such structures.

Electrically conducting glass has been useful for the removal or prevention of ice, frost and fog formations, and has been used commercially in aircraft windshields. Military aircraft, in particular, use such windshields to advantage and often fly at such high altitudes that the outside air temperature may be —50° F. or lower. It is customary in such windshields to provide a laminated safety glass which is made up of two or more sheets or plates of glass laminated together with one or more interlayers of non-brittle thermoplastic material, such as polyvinyl butyral resin. Such a structure provides the necessary strength for pressurized cabins and adds protection against breakage which is likely to occur particularly in military aircraft under combat conditions. Such windshields are also equipped with a transparent film or coating capable of conducting electrical energy and operating to remove accumulations of ice, frost or fog by internal heating of the glass. Generally, the electrically conducting film is located on the inside surface of the outside sheet or plate of glass so that the film is enclosed in the unit and protected from scratching or the like, and yet is located sufficiently close to the outside surface of the glass unit to provide satisfactory heating.

These electrically conducting films may be produced by various methods well known to the art. For example, such a filming operaion may involve heating the glass sheet to substantially its point of softening, and then spraying the surface of the heated glass with a suitable material, such as a tin halide, to form upon said sheet a transparent, continuous electrically conducting coating of tin oxide. Electrodes of sprayed copper, copper alloy, gold, or fired-on silver-flux are applied along spaced lines on the surface of the glass sheet and suitable lead wires are connected to these electrodes to supply electrical energy to the glass sheet.

Although electrically conducting films of the above character may be made substantially uniform, it is not always possible at the present time to provide films having uniform heating properties, particularly when irregular shapes are used. However, it is necessary that the heat dissipation be fairly uniform because otherwise thermal stresses would be set up which might warp or break the glass under operating conditions. In order to check the electrical properties of the glass sheet, a number of constants have been developed by the Boeing Aircraft Company, and in order for a glass sheet to be satisfactory for certain uses, these constants must be within certain limits. Accordingly, it is customary in manufacture of such filmed glass sheets, particularly where the intended use is in an aircraft windshield, to determine these constants for each sheet of glass.

In determining these electrical properties of a filmed glass sheet, the first step is generally the location of the hot spot or point of maximum heat dissipation. This may be done by using the wax or frost melting method. In accordance with the wax melting method, the sheet is covered with a film of wax, which is uniformly applied thereover, and heated under its own power. The first area where wax melts is considered the hot spot.

Another critical point on the electrically conducting film is the control point where the means for controlling the heat to the entire panel is located. In certain aircraft windshields, it is customary to provide thermisters or sensing elements which act as thermostats and regulate the power applied to the electrically conducting film according to the temperature at the control point. This control point may be located at a variety of places on the surface of the glass sheet, but it is customary to select a point along a margin of the sheet for the most practical attachment and to avoid interfering with the transparency of the main portion of the sheet.

In accordance with the above factors it is seen that the heat dissipation over the entire sheet, the heat dissipation at the hot spot, and the heat dissipation at the control spot are important factors in the operation of a windshield made from such a filmed glass sheet. Accordingly, these factors are involved in the measurement of the electrical properties of such a sheet and are determinative of the power constants developed by Boeing. Generally speaking, the constants are $K_m$, $K_h$ and $K_a$, and are substantially as shown below:

$$K_m = \frac{\text{average power}}{\text{power at hot spot}}$$

$$K_h = \frac{\text{power at the hot spot}}{\text{power at the control point}}$$

$$K_a = \frac{\text{average power}}{\text{power at the control point}}$$

These constants are actually measurements which bear a relationship to the above expressions, and are the result of the test procedure hereinafter given. One of the measurements needed is the area of an electrically conducting film between the electrodes which will be designated as the heated area. Another measurement needed is the thickness of the glass sheet, and both of these measurements are substantially constant for a series of similar electrically conducting sheets of glass. However, for accurate results, these measurements are made for each individual sheet by accurate measuring instruments well known to the art.

Another of the factors involved is the power applied to the electrically conducting film during the testing thereof, and this is determined by a wattmeter appropriately attached to the lead wires. The average power mentioned in the above formulas is represented for the purposes of this test as follows:

$$\text{Average power} = \frac{\text{watts}}{\text{area}}$$

The above measurements are sufficient for this determination. The power at the hot spot in the above formulas may be represented by the following formula:

$$\text{The power at hot spot} = 4.14 \times \frac{\text{temperature lag}}{\text{thickness in inches}}$$

In the above formula, the thickness measured at the hot spot and the temperature lag is determined by a procedure more fully described hereinafter. The power at the control point is determined in the same manner as the power at the hot spot, but the measurements of thickness and temperature lag are taken at the control point instead of at the hot spot.

Accordingly, it is seen that the various constants may be represented by the following formulas:

$$K_m = \frac{\text{watts} \times \text{thickness (hot spot)}}{4.14 \times \text{area} \times \text{temp. lag (hot spot)}}$$

$$K_a = \frac{\text{watts} \times \text{thickness (control point)}}{4.14 \times \text{area} \times \text{temp. lag (control point)}}$$

$$K_h = \frac{K_a}{K_m}$$

From the above formulas, it is evident that an extensive calculation is required to determine the various power constants from the test data, and that such a procedure is not suitable for production operation.

Accordingly, it is a primary object of this invention to provide an apparatus for determining these constants which is practical on a production line, and which may be operated by relatively unskilled employees.

Another object of this invention is to provide an apparatus for determining the above mentioned power constants which substantially eliminates error and provides reliable results.

It is extremely important that these constants be determined without serious error or mistake because the consequences may be serious if a defective sheet of glass should be fabricated into a finished windshield and fail at high speeds and high altitudes. Therefore, it is particularly important to eliminate as many possibilities of human error as possible.

A further object of this invention is to provide for automatic operation of the test procedure insofar as the various measurements may be combined to increase production efficiency.

Other objects and advantages of the invention will become more apparent during the course of the following description, when taken in connection with the accompanying drawings.

In the drawings, wherein like numerals are employed to designate like parts throughout the same:

FIG. 1 is a perspective view of a calculating machine constructed in accordance with this invention;

FIG. 2 is a perspective view illustrating a set up used for measuring the temperature lag;

FIG. 3 is a fragmentary cross-sectional view illustrating the placement of thermocouples in the measurement for temperature lag;

FIG. 4 is a schematic illustration of the wiring and circuits which may be used in the apparatus of this invention;

FIG. 8 is a schematic illustration of how the temperature lag measurements may be made automatically and recorded on the apparatus of this invention.

Figure 5:
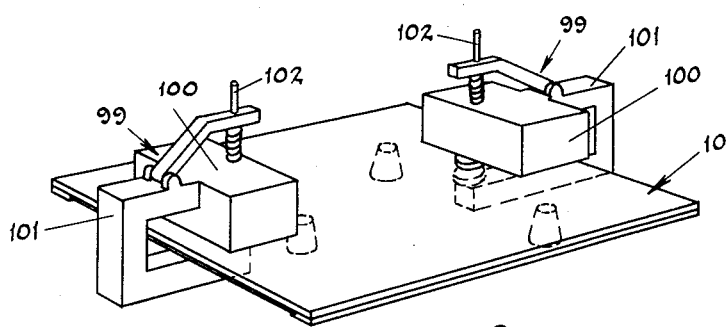
FIG. 5 is a perspective view illustrating another set up which may be used for measuring the temperature lags and thicknesses automatically.

Referring now more particularly to FIGS. 2 and 3, there is shown a set up which illustrates how the above mentioned temperature lag is measured. In FIG. 2, there is shown an electrically conducting glass unit 10 to be tested which comprises a glass sheet or plate 11 having an electrically conducting film 12 disposed on a surface thereof and in electrical contact with a pair of spaced electrodes 13. The unit 10 is preferably supported from a table by three or more cushion supports 14 with the electrically conducting film 12 facing downwardly as shown in FIG. 2. The electrically conducting film is attached to a power source capable of delivering 200 watts or more per square foot by means of lead wires 15 and 16 which are attached to the electrodes 13 and a power source or outlet 17. Also attached to the lead wires 15 and 16 is a wattmeter 18 for measuring the actual power applied to the electrically conducting film and a powerstat 19 to regulate the actual wattage delivered to the film.

A thermocouple clamp 20 is clamped onto the glass sheet at the hot spot as illustrated in FIG. 2 for measuring the temperature lag at the hot spot. The thermocouples must be held with considerable pressure against the surfaces in order to minimize the resistance to heat transfer across the boundary between the thermocouple and the heated surface. At the same time, the amount of heat absorbed and conducted by the supporting block must be held to a minimum, and the thermocouple supporting blocks 21 and 22 are made of a firm material having a very low thermal conductivity and thermal capacity such as cellulose acetate, cork, balsa wood or the like.

As shown in FIG. 2, the clamp may be composed of a bifurcated body 23 having substantially parallel members 24 and 25 attached to fit on each side of a sheet of glass. The member 25 carries the thermocouple support 22 in fixed relation by means of a shaft 26, and the member 24 carries a thermocouple support block 21 in clamping relation by means of shaft 27 which is mounted within the clamping member 28 so that a clamping engagement may be effected between thermocouple support blocks 21 and 22 by positioning the member 28. The actual pressure is applied by the compression spring 29 which is compressed between the clamping member 28 and support block 21.

The thermocouple lead wires are preferably iron and constantan ribbons welded together and may be made by rolling number 30 wire down to a thickness of about .0025 inch. A thermocouple junction 30 is provided on thermocouple support 21 and has lead wires 31 and 32 extending therefrom. A second thermocouple junction 33 is provided on thermocouple support 32 and has lead wires 34 and 35 extending therefrom. The lead wires 31 and 32, 34 and 35 must be insulated for a length of two to three inches from their junctions and the junctions and supports must be symmetrically placed with the junctions 30 and 33 having substantially the same area of contact. Also, the junction 33 must be insulated from the electrically conducting film 12 and this may be accomplished by placing a piece of vellum over the junction and cementing it to the support block. The thermocouple junctions are wired in opposed relationship and from there attached to the potentiometer which in effect measures the temperature differences between the two thermocouple junctions 30 and 33. It is this measurement which is utilized in determining the temperature lag.

The temperature lag in effect measures the dissipation of the electrical energy at the particular point measured so that the thickness of the glass affects the procedure. For quarter inch glass, power is turned on so that about 200 watts per square foot is applied to the panel and at the end of one minute the temperature difference between the thermocouple junctions is measured and the power turned off. One minute is allowed for the surface temperature to stabilize, and the potentiometer 36 is again ready to give a second reading of the temperature difference between the thermocouple junctions. It is the difference between the first and second reading or the first reading minus the second reading which gives the temperature lag. For 3/16 inch glass, the required time intervals are 45 seconds and for 3/8 inch glass, the required time intervals are 90 seconds. When the thermocouple junctions are clamped at the hot spot and this measurement taken, the result is the temperature lag at the hot spot and when the thermocouple junctions are set up at the control point and these measurements taken, the result is the temperature lag at the control point. If desired, two sets of thermocouples and two potentiometers may be used to determine both temperature lags simultaneously. However, it is necessary that these readings be taken either manually or automatically at the required time instant.

With the various required measurements obtained, i.e. the watts input to the conductive film, thickness of the glass at both the control point and the hot spot, film area between the electrodes, and temperature lags at both the control point and hot spot, it is now possible to perform the calculation of the film constants using these measurements and the formulas given hereinabove. These calculations may be performed manually, by the use of conventional office calculating machines (comptometers, etc.), by the use of digital or analog calculators, or in a number of other ways. However, because of a high degree of accuracy required and the relatively high production quantity involved, calculating done either manually or by the use of conventional office calculating machines is not considered fast enough or reliable enough. Two methods which may be used for obtaining solutions to said formulas, rapidly and reliably, are those of digital and analog calculation. However, because of the relatively high expense and greater complexity of digital calculating, the analog method is considered preferable.

A fundamental principle on which the computation method as disclosed herein is based, is that of producing an electronic equivalent of a slide rule. It will be recalled that the slide rule depends for its operation on the fundamental mathematical proposition that the sum of the logarithms of two numbers is the logarithm of the product of these two numbers, and that the difference of these numbers' logarithms is the logarithm of the quotient of these numbers. Thus in the case of a conventional slide rule numerical values are ruled with the ruled distances between the values bearing a logarithmic relationship to the numerical values, so that by adding or subtracting these distances a multiplying or dividing operation of the numerical values may be obtained.

An electrical equivalent of a conventional slide rule may be obtained by adding or subtracting voltages which bear logarithmic relationships to numbers which are to be multiplied or divided, and the resultant voltage may be read on a suitably calibrated meter, or other indicating device, directly as the required product or quotient of the numbers. Voltages which bear a logarithmic relationship to numerical values may be obtianed, as is shown herein, by obtaining a dial which has numerical values ruled on it logarithmically and attaching the dial to the adjustment shaft of a linear potentiometer which has a fixed voltage impressed across it.

Referring to FIG. 1, there is shown an electronic computing device 37 which may be used for obtaining solutions to the equations for the determination of three film constants ($k_a$, $k_h$, $k_m$) given previously. At the lower front of the calculating device 37 in FIG. 1 there is located a manual switch 38 which is provided for connecting and disconnecting input power to the calculator. Just above the input power switch 38 there are four manual switches 39, 40, 41 and 42 disposed in a horizontal line, which when thrown to the ON position inject constant voltages, representing constant factors in the film constant equations, into the calculator. Just above each of these switches there are nameplates which point out specifically which constant each switch controls.

Located in a horizontally spaced relation just above the row of switches 39 to 42 are a row of six cylindrical indicating dials 43, 44, 45, 46, 47 and 48 each having knurled adjusting wheels 49 positioned to the right of each. These dials are inscribed on the peripheral surface that is presented outwardly as shown in FIG. 1 with a series of numbers which are in equally spaced relationship. Turning of a dial's respective knurled adjusting wheel 49 rotates the dial and a variable resistor or potentiometer attached to the shaft thereof which provides a voltage output in a logarithmic functional relation. A particular setting is obtained by turning the adjusting wheel until the required dial's crosshair indicates the desired quantity on the surface of the dial. Also above each of these dials 43 to 48, a nameplate is provided that tells which particular measured quantity or factor may be placed in the calculator by adjusting a certain dial.

Centrally located on the front of the slanted face of the calculator 37 and disposed in a horizontal line are a row of three cylindrical indicating dials 50, 51 and 52 with linearly spaced numerical designations on the peripheral surface thereof. Above these dials are nameplates pointing out that each dial is adapted to provide a reading of one of the above mentioned film constants. It is these dials 50 to 52 on which the calculated film constants are automatically indicated.

In FIG. 4 there is shown a preferred electrical circuit to be used in conjunction with the computing device 37 of FIG. 1. The main parts of the circuit are a negative voltage supply 53, a positive voltage supply 54, three amplifiers 55, 56 and 57, a bank of variable resistors or potentiometers and fixed resistors operably connected between the voltage supplies 53 and 54 and the three amplifiers, and three servo-motors 58, 59 and 60, which are powered by the outputs of the amplifiers. Each of the motors are operably connected to drive one of the film constant dials 50 to 52 together with one of three negative feedback potentiometers 61, 62 and 63. For example, the motor 58 drives both the film constant dial 50 and the potentiometer dial 61.

Briefly, the calculation of a film constant consists of inserting the sums and/or differences of several voltages into an amplifier, which voltages are logarithmically related to factors which it is desired to multiply or divide. The amplifier on being biased by these signal voltages produces a voltage at its output terminal which powers a servo-motor. The rotation of a servo-motor turns a potentiometer in such a direction so as to present an increasing voltage, but opposite in polarity to the original signal voltage, to the input of the amplifier. The continued turning of the motor will raise this negative-feedback voltage to such a value that the original signal voltage being inserted into the amplifier is completely counteracted, thus leaving a resultant input signal voltage of approximately zero and stop the motor. The turning of a motor, besides operating the feedback potentiometer, also rotates a film constant dial. This indicating dial will therefore automatically register the numerical equivalent of the sums and/or differences of the various logarithmic voltages which were inserted into the amplifier or in other words the particular film constant calculation desired has been performed and the solution automatically indicated.

According to the equation given previously for the calculation of film constant $K_m$, there are five different factors which are involved in this calculation and they are, watts, thickness at the hot spot, area, a constant (4.14), and the temperature lag at the control point. Recalling from the theoretical discussion given above that when it is desired to multiply two numbers, their logarithms are added and when it is desired to divide one number by another their logarithms are subtracted, it is easily seen that the voltages for watts and thickness at the hot spot will be positive voltages whereas the voltages for area, 4.14, and temperature at the hot spot will be negative.

First in order to perform a calculation of $K_m$, the input power switch 38 is turned to the On position and power is then available to all of the amplifiers and the negative and positive voltage supplies. Having obtained a measurement of the power input to the windshield, adjustment of dial 43 to correspond to this measurement will also provide an adjustment of a set-up potentiometer 64 and thus a logarithmic voltage equivalent to the setting made on the dial 43 is now provided to amplifier 56 by wire 65, resistor 66, potentiometer 64, resistor 67, wire 68, and the positive voltage supply 54.

With a thickness measurement having been taken at the hot spot, this valve is set up in the calculating apparatus 37 by the adjustment of the thickness M dial 47, which presents a positive signal to the amplifier 56 through wire 65, resistor 69, set-up potentiometer 70, resistor 71, wire 68, and the positive voltage supply 54. In a similar manner, a setting of the area obtained is made on dial 44 which adjusts set-up potentiometer 72 and presents a signal from the negative voltage supply 53 through wire 73, resistor 74, area set-up potentiometer 72, resistor 75, and wire 65 to $K_m$ amplifier 56.

A negative voltage corresponding to the constant 4.14 is obtained through an internal connection which provides a circuit from the negative voltage supply 53 through a fixed variable resistor 76, resistor 77, and wire 65 to the amplifier 56.

A signal voltage for the temperature factor at the hot spot is provided by setting the determined value on the temperature lag M dial 48 and the resulting adjustment of temperature lag M set-up potentiometer 78 provides a signal from negative voltage supply 53, wire 73, resistor 79, potentiometer 78, resistor 80 and wire 65 to $K_m$ amplifier 56.

There is now present at the input to the $K_m$ amplifier 56 a logarithmic voltage equivalent to the logarithmic value of the constant $K_m$ which has been obtained by calculating using the equation given previously and the various measurements taken. The amplifier now so biased produces a voltage at its output terminal which when supplied to servo-motor 59 causes this motor to rotate. Rotation of motor 59 causes both film constant dial 52 to turn and $K_m$ feedback potentiometer 62 to have its setting changed.

Feedback potentiometer 62, which is connected in parallel across the positive voltage supply 54 and the negative voltage supply 53, can provide, depending upon its adjustment, a wide range of signal potential. The motor 59 turns in such a direction so as to adjust the potentiometer 62 to give a signal voltage from point 81 through resistor 82, and wire 65 to the amplifier 56 which is increasing in value and opposite in polarity to the signal which was originally applied to the amplifier. Thus, it is easily seen that when this negative feedback signal reaches a certain value the resultant voltage obtainable at the input of the amplifier 56 is insufficient to produce an output voltage large enough to drive the motor 59. Therefore, at this time, the $K_m$ constant dial 52 is stopped and indicates by its crosshair the calculated value for the constant $K_m$.

By a process which is the same as given for the calculation of the constant $K_m$ in the preceding paragraphs, the film constant $K_a$ is obtained. First a voltage corresponding to the watts input is obtained from the positive voltage supply 54 through resistor 67, set-up potentiometer 64 having been set by dial 43, resistor 83, wire 84, to $K_a$ amplifier 55; the voltage for thickness A is provided by positive voltage supply 54, wire 68, resistor 85, set-up potentiometer 86 having been set by dial 45, resistor 87, wire 84 to amplifier 55; the signal for the area is obtained from the negative voltage supply 53, through wire 73, resistor 74, area set-up potentiometer 72 having been set by dial 44, resistor 88, wire 84, and amplifier 55; the constant negative voltage 4.14 is provided from the negative voltage supply 53 through the fixed variable resistor 76, resistor 89, wire 84 to amplifier 55; and the final factor, temperature lag A, is provided from voltage supply 53 through resistor 90, temperature lag A set-up potentiometer 91, resistor 92 and wire 84 to the amplifier 55. Again in a similar fashion as before, the amplifier 55 drives the motor 58 which turns the film constant dial 50 and a negative feedback potentiometer 61 which provides a signal of opposite polarity to amplifier 55. The motor continues driving until the system is brought into balance and a film constant $K_a$ is indicated on dial 50.

The determination of the value of the film constant $K_h$ may be obtained without any further settings since, it will be recalled, $K_h$ is merely the quotient of $K_a$ divided by $K_m$ both of which have already been calculated. Electrically this division may be obtained by taking the difference of the voltages which are present at points 81 and 93, since these voltages are the logarithmic equivalents of $K_m$ and $K_a$ respectively. As is shown in FIG. 4 the potential at point 81 is brought by wire 94 and resistor 95 to point 96, and thence to the amplifier 57. Likewise the voltage at point 93 is brought by means of wire 97, resistor 98 to point 96 and then to the amplifier. Since resistors 95 and 98 are equal to the potential which exists at point 96, and thus that presented to the input of the amplifier 57, is equal to the difference of the voltages at point 81 and point 93.

As was shown before, the signal powers the amplifier 57 whose output causes motor 60 to turn and a feedback signal obtained from $K_h$ potentiometer 63 for balancing the original signal input, stopping the motor 60, and indicating on the $K_h$ dial indicator 51 the value of $K_h$ as obtained.

In the discussion of the calculation operation given above it will be noted that no description was given of the operation of the four manual switches 39 to 42. These switches have been provided for the insertion of various voltages into the calculator 37 corresponding to constant factors of 10 which are needed because of the various sizes of windows which are to be tested, the varying amounts of power which will be used on these windows, and the correspondingly wide variation of temperature lag that may be encountered in the different windows. However, since their use is of a minor character, at least in regard to the disclosure of the operation of the calculator 37, the effect of these switches in the electrical operation of the invention is not gone into in great detail. However, location of the switches in FIG. 4 is as follows: (1) watts×10 switch is 39; (2) area divided by 10 switch is 40; (3) temperature lag A switch×10 is 41; (4) temperature lag M×10 switch is 42. An examination of these various switches in FIG. 4 when coupled with the previous discussion of the operation of the calculator will enable anyone skilled in the art to determine the exact function of each switch.

Because of the desirability, especially in large production runs, of increasing the speed of determination of the film constants and also of decreasing the likelihood of human error in the determination of these constants, a modification, which outwardly may appear the same as the calculator 37 shown in FIG. 1, is provided which automatically performs the setting up of the necessary variable factors in a calculator. It is not necessary to obtain a completely automatic operation for a considerable improvement, since for a given production run the factors of area and watts will be substantially constant and may be set initially with little or no change of the setting being necessary throughout the remainder of the run. However, the temperature lag A, temperature lag M, thickness A, and thickness M factors will vary with each sample that is tested and therefore their automatic determination and insertion into the calculator will expedite production facilities considerably.

Referring to FIG. 5 there is shown a window or windshield 10 which is to be tested, with two testing heads 99 clamped into place. These testing heads 99 are essentially the same as the thermocouple clamp 20 disclosed previously except a linear differential transformer 100 has been added in one of the clamping arms of each. The linear differential transformer 100 is placed in one of the clamping arms 101 with its core operably connected to a shaft 102. The detailed operation of these testing heads 99 for thickness measuring will be disclosed later. Also the testing heads 99 have thermocouples which are connected as shown in FIGS. 2 and 3 and hereinbefore described. The external connections and operation of the thermocouples and operation in conjunction with their associated equipment will be disclosed hereinafter.

Figure 6:
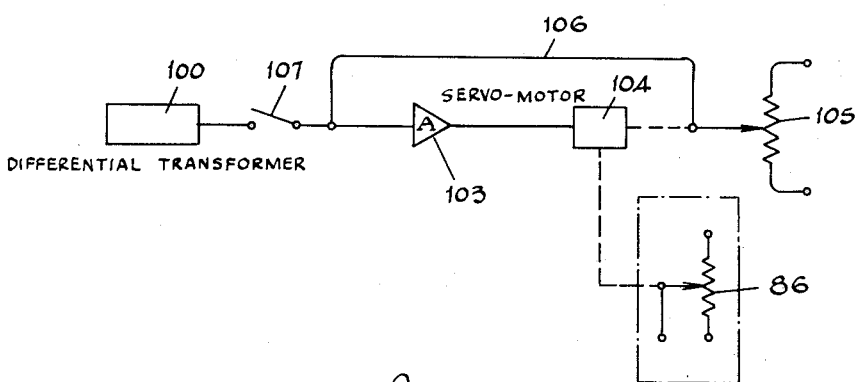
FIG. 6 is a schematic diagram illustrating the electrical operation of an automatic thickness measuring device.

Referring now to FIG. 6, there is shown in block form the circuit for measuring automatically the thickness of the window or windshield 10. As was pointed out before, in the clamping head 99 there is a linear differential transformer 100 whose core is connected to the rod 102 which positions the core in the coils of the transformer according to the thickness of the glass. This positioning of the core in the transformer coils produces variable reluctance, which may be connected to an amplifier 103 so that a voltage may be obtained from the output of the amplifier which bears a linear relationship to the reluctance of the transformer and thus to the thickness of the window 10 at the point measured.

A reversible servo-motor 104 is powered by the output voltage of the amplifier 103 and positions a control potentiometer 105 which provides a negative feedback in a manner which was described before, connected across the negative voltage supply 53 and positive voltage supply 54.

A negative feedback voltage is taken off potentiometer 105 and fed into the input of amplifier 103 by wire 106. The motor will continue to turn until the negative feedback voltage brings the input voltage to zero. Also this motor turns the thickness A dial 46 and the thickness set-up potentiometer 86 to a position which corresponds to the thickness of the window at the control point measured. From here on the calculations are performed the same as given previously.

Although this description has been given for thickness A the procedure, circuit and connections are the same for thickness M, except that the indicator which is turned is the thickness M indicator and the potentiometer adjusted is set-up potentiometer 70.

Thus, it can be seen that the only manual operation for the determination and insertion of the voltage corresponding to the thickness of the window into the calculator 37 is that of clamping the two test heads 99 into place on the window 10, one on the control point and the other on the hot spot. The switch 107 that connects and disconnects the differential transformer 100 with the input of amplifier 103 is actuated by a timing cam 108 shown in FIG. 7, which will be described hereinbelow.

The circuit in block form for the automatic insertion of temperature logarithmic voltages into the calculator 37 is shown in FIG. 8. The essential parts of this apparatus are thermocouples 109 which are similar to the thermocouples 21 and 22 which have been described in detail, a unit 110 which includes an indicator and an amplifier, a switch 111, a reversing battery 112, a range switch 113, an amplifier 114, a reversible servo-motor 115, two magnetic clutches 116 and 117 for individually disconnecting the motor from a potentiometer 118, and also from temperature lag A dial 46 and its corresponding potentiometer 91 and a control potentiometer 119. The actuation of the switches 111 and 113, and the magnetic clutches is performed by a series of cams which are arranged to operate in a timed relationship.

Figure 7:
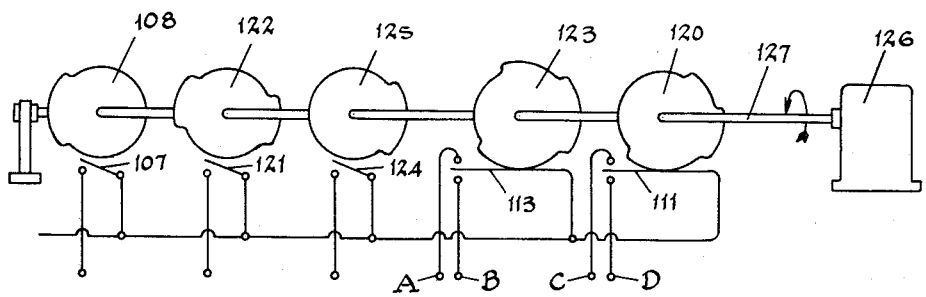
FIG. 7 is a schematic diagram illustrating a time control mechanism which may be used in the automatic operation of the apparatus of this invention.

As is shown particularly in FIG. 8, and recalling the temperature lag determination given hereinabove, the thermocouples are connected to the indicating potentiometer 110 and when at the end of the heating cycle time, the switch 111 has been thrown to the upward or C position by operation of timing cam 120 as shown in FIG. 7, an amplified signal from the unit 110 is put into the amplifier 114 and the amplifier's output begins to drive the motor 115. While this motor is turning, magnetic clutch 117 is energized by a closing of a switch 121 by a timing cam 122 (FIG. 7) and magnetic clutch 117 is engaged thereby providing rotative power to the temperature lag A dial 46 and its corresponding set-up potentiometer 91, as well as control potentiometer 119 which provides a voltage corresponding to the setting on dial 46. Also during this adjustment of the control potentiometer 119, switch 113 is connected to the A position by cam 123. Potentiometer 119 which is connected across positive voltage supply 54 and negative voltage supply 53 provides a negative feedback signal through switch 113 to the amplifier 114 and thus will provide for a balancing of the amplifier. A reading on temperature lag A dial 46 and the setting of the potentiometer 91 is equivalent to the temperature that is being read by thermocouple 109. After sufficient time is allowed for this temperature measurement to be taken, which temperature will be referred to as $T_1$, the power source is disconnected from window 10, the magnetic clutch 117 is deenergized by opening of switch 121, temperature lag A dial 46 will continue to register the reading $T_1$, and potentiometers 119 and 91 will hold their positions of adjustment which are equivalent to the temperature $T_1$.

With the power removed from the window, it begins to cool and this cooling is allowed for a certain prescribed time as set forth above. At the end of the this prescribed time, switch 113 is opened, switch 111 is still closed in the C position and the magnetic clutch 116 is energized by switch 124 that has been actuated by timing cam 125. The temperature $T_2$ is now being indicated on the unit 110, and the corresponding signal is fed through the switch 111 into the amplifier 114 whose output powers the motor 115 which begins to rotate. With the turning of the motor 115, since the clutch 116 is engaged, the control potentiometer 118, connected across the positive power supply 54 and the negative power supply 53, is adjusted to supply a negative feedback voltage through the switch 113 which is now connected to the B position by operation of cam 123 and the feedback voltage, will counteract the signal that is being injected into the amplifier and thus bring the system to a balance. At this instant the potentiometers 119 and 91 have settings corresponding to temperature $T_1$, and the potentiometer 118 has a setting corresponding to temperature $T_2$.

After sufficient time has been allowed for this transferring of temperature $T_2$ into an equivalent setting on potentiometer 118, switch 111 is moved to the position D so that the reversing battery 112 is connected to the input of amplifier 114. Also magnetic clutch 117 is energized connecting the temperature lag A indicator 46 and the potentiometers 91 and 119 with the motor shaft. The reversing battery 112 is of sufficient voltage and polarity that on being amplified by amplifier 114 it causes the motor 115 to drive potentiometer 118 back to a position of zero reading. Also since the magnetic clutch 117 is engaged, the motor 115 will drive the temperature lag A dial 46 back by this same amount and the potentiometers 91 and 119 will have their settings reduced by the value that was on the potentiometer 118, viz., $T_2$.

Again allowing sufficient time for this last operation to take place, cam 125 releases switch 124 deenergizing magnetic clutch 116, switch 113 is thrown to the open position by operation of cam 123, and also swich 111 is thrown to the open position by operation of cam 120. At this time there is a setting on the potentiometer 91, and a visual indication on the temperature lag A dial 46 which is equivalent to the temperature $T_1$ minus $T_2$ or the desired temperature lag measurement at the control point of window 10 being tested. With set-up potentiometer 91 adjusted to a setting corresponding to $T_1 - T_2$, a logarithmic voltage equivalent to this setting will be presented to the calculator and the calculation will proceed as shown before.

Although this operation was discussed in detail for the temperature lag A, which is measured by thermocouples of one of the testing heads 99, the temperature lag M is simultaneously measured by a similar apparatus operating from the other testing head 99, and positioning the temperature lag M dial 47.

It is contemplated that any set-up may be used which will put the value $T_1-T_2$ on the set-up potentiometer 91; the important factor being that the set-up potentiometer deliver a voltage corresponding to the logarithm of this value. In the embodiment discussed above the control potentiometers and the dial 46 are linear so that the subtraction which is effected through the voltages of the control potentiometers provides a subtraction on the dial. The conversion of this datum to a log value is done by using a log set-up potentiometer 91 in combination with the linear scale on dial 46. While this is the preferred set-up for the automatic operation, in the manual operation for this dial and set-up potentiometers or other manually operated set-up potentiometers, the same result may be achieved by using a log scale on the dial and a linear potentiometer.

In the automatic embodiment of this invention, all the operator needs to do is adjust the testing heads 99 in the appropriate positions, turn the power on, allow the timing cycle to run through its normal operation, and read the desired constants from the dials 50 to 52. Then the power is turned off, the testing heads removed and the operator is ready to test another electrically conducting glass sheet 10. It is readily seen that the automatic embodiment of this invention has advantages in speed and reduction of human error and allows for the immediate reading of the special constants which are measured in accordance with the Boeing test procedure set out above.

As has been explained above, the timing for the duration of the power on period and the power off period depends upon the thickness of the glass sheets being tested. Accordingly, mechanism 126 is provided for driving the shaft 127 on which the timing cams are mounted at any one of a number of set fixed speeds. For example, for 3/16 inch glass, the power on time is 45 seconds and the power off time is 45 seconds; whereas, for 3/8 inch glass, the required time intervals are both 90 seconds. Accordingly, shaft 127 is rotated at twice the speed for 3/16 inch glass as compared to the rate of rotating for 3/8 inch glass. Similarly, the rotation of shaft 127 may be adjusted for quarter inch glass in which one minute is required for the power on and power off intervals.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. Apparatus for determining electrical characteristics of an electrically conducting film on the surface of a glass sheet while an electric current is passing through said film, comprising a plurality of logarithmic set-up potentiometers, electrical drive means operably connected to said potentiometers, a plurality of feed-back potentiometers connected in electrical opposition to the resultant voltages of selected combinations of said set-up potentiometers, a second drive means operably connected to said feed-back potentiometers, indicia on said feed-back potentiometers for indicating the results of multiplications and divisions achieved by the addition of the positive and negative logarithmic values of the output voltages of the selected combination of set-up potentiometers, means for measuring temperature and thickness of selected portions of the film while current is passing therethrough and converting said measurements into electric signals, and means electrically connecting said measuring and converting means to said first-named drive means for positioning said set-up potentiometers to provide logarithmic voltages corresponding to said measurements.

2. Apparatus for determining electrical characteristics of an electrically conducting film as claimed in claim 1, in which said measuring means comprises a differential transformer adapted for receiving the glass sheet and the film thereon through an air gap in its core to vary its electrical output and a thermocouple in contact with said film for measuring the temperature thereof.

3. In apparatus for determining constants indicating the uniformity of conductivity of an electrically conducting film on a non-conducting sheet, said constants being calculated by selected multiplications and divisions of fixed factors and variable factors of temperature and film thickness by converting the factors to logarithmic voltages on set-up potentiometers that are algebraically added to provide resultant voltages which are read out on adjustable potentiometers provided with indicia for indicating numerical values for the constants, a differential transformer arranged with respect to the glass sheet and film contained thereon to provide a first electric signal proportional to the film thickness, thermocouple means for measuring the temperature of said film and producing a second electric signal proportional to the temperature thereof, and individual drive means responsive to said electric signals for adjusting said set-up potentiometers to provide logarithmic voltages corresponding to said thickness measurement and to said temperature measurement.

4. In apparatus for determining constants as claimed in claim 3, comprising timing means for sequentially connecting the temperature and thickness electrical signals to said set-up potentiometers.

5. In apparatus for determining constants as claimed in claim 4, wherein said timing means includes a plurality of cams the surfaces of which actuate switches for connecting said signals to said set-up potentiometers in a predetermined order and timing arrangement.

6. Apparatus for determining constants measuring the uniformity of conductivity of an electrically conducting film on a non-conducting sheet, said constants being determined by the following formulas:

$$K_m = \frac{\text{watts} \times \text{thickness (hot spot)}}{4.14 \times \text{area} \times \text{temp. lag (hot spot)}}$$

$$K_a = \frac{\text{watts} \times \text{thickness (control point)}}{4.14 \times \text{area} \times \text{temp. lag (control point)}}$$

$$K_h = \frac{K_a}{K_m}$$

in which watts is the value in watts of the power input to the film during measurement, thickness (hot spot) is the thickness of the sheet at the point of lowest electrical resistance of the film, area is the area of the film surface, temperature lag (hot spot) is the difference in temperature at this point between the temperature existing after a fixed application of power and the temperature after a fixed cooling off period at the point of lowest electrical resistance, thickness (control point) is the thickness of the sheet at the point on the film chosen for controlling the film, and temperature lag (control point) is the difference in the temperature after power is applied to the film for a fixed period of time and the temperature existing after the film has been allowed to cool for a fixed period of time at the point chosen for controlling the film; said apparatus comprising a negative voltage supply, a positive voltage supply, a plurality of set-up potentiometers one for each of the factors in said formulas, means connecting each of said set-up potentiometers associated with the divisor factors to said negative voltage supply and for connecting said dividend factors to said positive voltage supply, means operatively connected to said set-up potentiometers for adjusting the output voltages to correspond to logarithmic values of measured data, means for interconnecting the outputs of the set-up potentiometers associated with each of the above formulas to provide independent resultant voltages corresponding to each of said constants, means connecting each of said resultant voltages to a separate feed-back potentiometer, means for driving said feed-back potentiometers to a position equal and opposite in voltage to the resultant voltages impressed thereupon, and indicia on said feed-back potentiometers for indicating the results of the computations achieved by the algebraic addition of the positive and negative logarithmic voltages and read-out on said feed-back potentiometers.

References Cited in the file of this patent

UNITED STATES PATENTS

| | | |
|---|---|---|
| 2,244,369 | Martin | June 3, 1941 |
| 2,554,811 | Bromberg et al. | May 29, 1951 |
| 2,673,030 | Isserstedt | Mar. 23, 1954 |
| 2,673,325 | Orr | Mar. 23, 1954 |
| 2,694,184 | Bledsoe et al. | Nov. 9, 1954 |
| 2,714,309 | Redemske | Aug. 2, 1955 |

OTHER REFERENCES

The University of Connecticut Engineering Experiment Station. Some Electronic Analogue Computer Techniques (Robb et al.) January 1953, pages 13–16.

Electronic Instruments (Greenwood et al.), 1948, pages 122 and 123.

Product Engineering (Wall), September 1953, pages 134–136.

Control Engineering (Davis), November 1954, page 44.